United States Patent [19]
Taube et al.

[11] Patent Number: 5,931,191
[45] Date of Patent: Aug. 3, 1999

[54] FLOW CONTROL VALVE FOR PASSING TWO FLUIDS IN OPPOSITE DIRECTIONS

[76] Inventors: Frank A. Taube; John D. Taube; Peter H. Greverath, all of 1363 Anderson St., Clawson, Mich. 48017

[21] Appl. No.: 09/188,516

[22] Filed: Nov. 9, 1998

Related U.S. Application Data

[62] Division of application No. 08/751,267, Nov. 18, 1996.

[51] Int. Cl.[6] ................................ F16K 31/12
[52] U.S. Cl. .................. 137/594; 137/504; 137/513; 137/512.5; 137/513.7; 137/514.3; 137/516.27
[58] Field of Search ................... 137/594, 504, 137/514.3, 513, 512.5, 513.7, 516.27

[56] References Cited

U.S. PATENT DOCUMENTS

| | | | |
|---|---|---|---|
| 2,471,798 | 5/1949 | Thomas | 137/594 |
| 2,584,418 | 2/1952 | Branson | 137/504 |
| 4,211,253 | 7/1980 | Ekman | 137/594 |
| 4,221,234 | 9/1980 | Kruschik | 137/594 X |
| 4,991,624 | 2/1991 | Fowler et al. | 137/594 |
| 5,232,028 | 8/1993 | Sunderhaus et al. | 137/594 X |
| 5,603,352 | 2/1997 | Tavor | 137/594 X |

*Primary Examiner*—Denise L. Ferensic
*Assistant Examiner*—Ramyar Farid
*Attorney, Agent, or Firm*—Charles W. Chandler

[57] ABSTRACT

A flow control valve includes a piston moveable in a cylindrical chamber between an inlet opening and an outlet opening. The piston head has a maximum diameter smaller than the wall of the chamber to define a fixed orifice. The opposite end of the piston has a sleeve which partially blocks the outlet opening depending upon the position of the piston in the chamber which in turn depends upon the pressure differential across the fixed orifice.

3 Claims, 4 Drawing Sheets

FLOW CONTROL VALVE FOR PASSING TWO FLUIDS IN OPPOSITE DIRECTIONS

CROSS-REFERENCE TO RELATED APPLICATIONS

This application is a divisional application of U.S. patent application Ser. No. 08/751,267 filed Nov. 18, 1996, for "Flow Control Valve for Passing Two Fluids in Opposite Directions.

BACKGROUND OF THE INVENTION

This invention is related to a flow control valve in which a piston head moves in a valve chamber to a position depending upon the differential pressure across a fixed orifice. The fixed orifice is defined by an annular opening between the edge of the piston head and the cylindrical wall of the valve chamber.

Flow control valves are known in the prior art. See for example, U.S. Pat. No. 4,922,956 which was issued May 8, 1990 to Frank A. Taube Sr., and Edward J. Rozniecki for "Fluid Flow Control Regulator"; U.S. Pat. No. 4,237,922 which was issued Dec. 9, 1980, to Albin Maier for "in-Line Flow Control Valve"; U.S. Pat. No. 4,175,584 which was issued Nov. 27, 1979, to Sotokazu Rikuta for "Control Valve for Keeping the Rate of Flow at a Fixed Value"; and U.S. Pat. No. 3,752,182 which was issued Aug. 14, 1973, to Glen Brand for "Pressure Compensated Flow Control Valve".

Such flow control valves permit the flow of only one fluid medium through the unit. Further such units typically require complex upstream pressure signal passages from the high pressure side of a measuring orifice, and have several moving components.

SUMMARY OF THE INVENTION

The broad purpose of the present invention is to provide an improved flow control valve having a minimum number of components. The preferred flow control valve comprises a housing having an internal chamber with a cylindrical wall, an inlet opening at one end of the chamber and an outlet opening at the opposite end of the chamber. A spring-biased piston is mounted in the chamber. The piston is axially moveable between the inlet opening and the outlet opening. The piston head has a diameter smaller than the diameter of the internal chamber wall to define a fixed annular orifice between the piston and the chamber wall. As the piston moves axially from the inlet opening toward the outlet opening, the area of the orifice between the piston and chamber wall remains constant.

The opposite end of the piston comprises a cylindrical sleeve that slides over the outlet opening in an orifice tube in response to changes in the fluid pressures. When the incoming fluid pressure increases, the sleeve reduces the area of the outlet opening to increase the internal pressure of the valve by an amount equal to the incoming fluid pressures increase thereby maintaining a constant flow. However, when the incoming fluid pressure is reduced, the piston moves toward the inlet opening thereby increasing the outlet opening to decrease the internal pressure by an amount equal to the incoming fluid pressure decrease thereby maintaining a constant fluid flow rate. The piston sleeve and the outlet opening thereby function as a variable orifice opening.

The preferred valve eliminates the need for complex upstream pressure signal passages from the high pressure side of a measuring orifice. The preferred valve reduces the number of pieces required to produce a rate of flow controller. It reduces the number of close tolerance components to two. The valve body can be made of a thin walled tubing or drawn metal, and welded to top and bottom fittings. The long length of the piston (valve sleeve), in relationship to the outside diameter of the valve tube, reduces the chances of cocking. The ratio of the effective length of the valve sleeve to the outside diameter of the valve tube is preferably 2:1, but no less than 1.5:1. The long length of the valve tube allows for a long spring chamber which gives exceptionally good guidance to the spring, preventing it from walking or cocking which would change the spring force. This also allows the use of a longer spring wire which reduces the pounds of force per inch of stroke thereby reducing differential pressure error.

The preferred flow control valve allows the passage of two fluids in a duplex conduit while controlling the flow of one of the fluids. An example of such an application would be for controlling the flow of gasoline in one direction while permitting vapor recovery under a suction in the opposite direction through a center tube.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
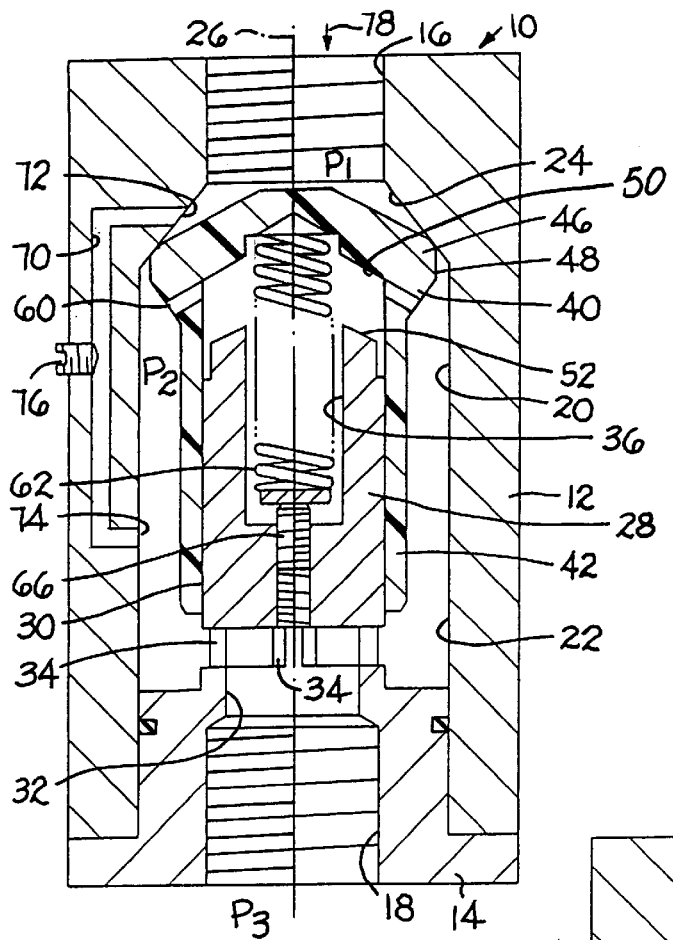
FIG. 1 is a longitudinal sectional view through a flow control valve illustrating the preferred embodiment of the invention with the piston fully closing the inlet opening.

Referring to the drawings, FIG. 1 illustrates a preferred flow control valve 10, which comprises a housing 12 having a lower fluid-tight cap 14. Both the housing and the cap are formed of a metal such as aluminum. One end of the housing defines a threaded inlet opening 16 which is axially aligned with a threaded outlet opening 18 in cap 14. The outlet opening is adapted to be connected to a conduit for delivering a fluid which may vary in pressure. The outlet opening delivers a constant flow rate of fluid to a suitable conduit regardless of the variable pressures. This is also true for the inlet opening.

The housing has an internal chamber 20 having a cylindrical inner surface 22. The diameter of the inlet opening is substantially smaller than the diameter of the inner surface 22 of the chamber. A frusto-conical surface 24 connects the inlet opening with the cylindrical wall of the chamber. The inlet opening and the outlet opening are both axially aligned along axis 26.

Cap 14 supports an elongated, axially disposed support tube 28 which functions as a valve tube having a cylindrical outer surface 30. The upper end of tube 28 has a spring-receiving cavity 36 supported along axis 26.

Figure 4:
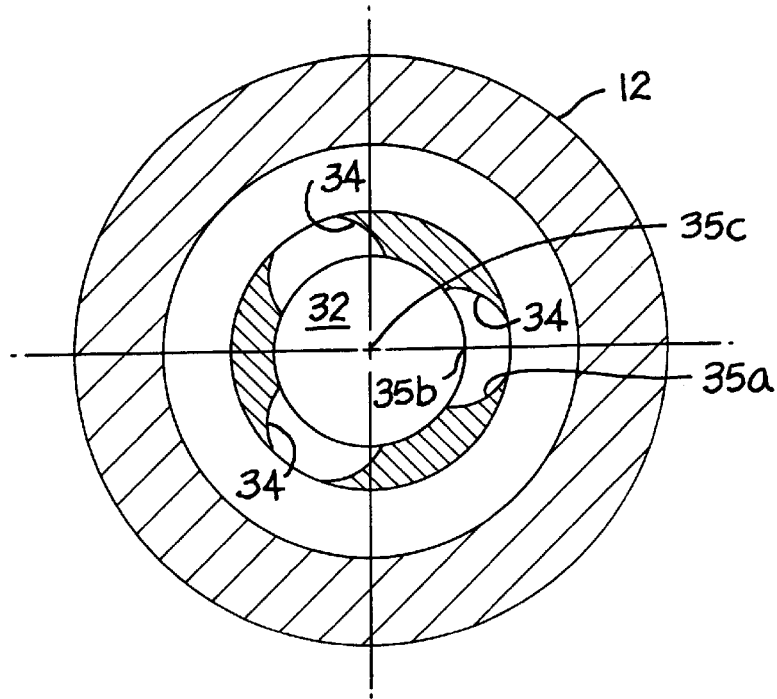
FIG. 4 is a sectional view as seen along lines 4—4 of FIG. 3.
Figure 5:
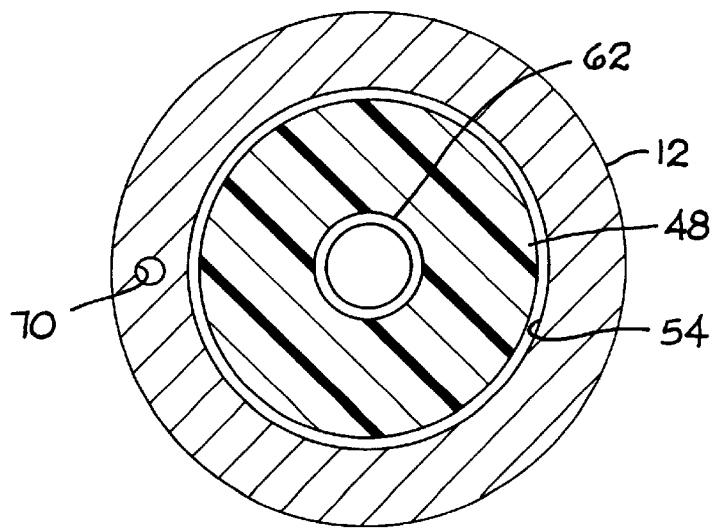
FIG. 5 is a sectional view as seen along the lines of 5—5 of FIG. 3.

Referring to FIG. 4, the valve tube has a central axial opening 32 connected with outlet opening 18, and three radial rectangular ports 34 permitting fluid communication between chamber 20 to outlet opening 18.

Each port 34 is formed by machining a partially cylindrical surface 35a about an axis as at 35b lying along a radial line passing through the longitudinal axis 35c, and between the outer surface of tube 28 and the axis 35c. This forms a concave surface that extends inwardly from the small outer end of the port. The port then has a small outer opening adjacent chamber 20, and a larger inner opening adjacent axial opening 32.

A piston 40 of plastic or other suitable material is disposed in chamber 20 and has a cylindrical valve sleeve 42 slideably mounted on support tube 28. The piston has a head 46 with an edge at 48 forming a portion of a sphere that has a diameter less than the diameter of the chamber wall. The piston is illustrated as having a somewhat flat top with a frusto-conical side surface, however, it can take other suitable shapes such as a rounded configuration.

Preferably the edge forms part of a sphere having a center lying along axis 26 to accommodate any misalignment of the piston in the chamber. The piston head acts as the customary impeller.

The piston head diameter at 48 is greater than the upper portion of frusto-conical surface 24 so that when the piston is moved toward inlet opening 16 it abuts frusto-conical surface 24 thereby closing off fluid flow from the inlet opening past the piston head. This allows the inlet pressure to build up, forcing piston 40 down and placing the piston head in a position in chamber 20 which creates a precalibrated orifice.

The piston has an overall length such that the lower edge of sleeve 42 is disposed above radial rectangular ports 34 when the piston head abuts frusto-conical surface 24. The piston is moveable to an extreme lower position in which internal surface 50 of the piston head abuts the upper end 52 of support tube 28 as viewed in the FIG. 2 position, and the valve sleeve blocks fluid flow through ports 34. The use of a valve sleeve over ports 34 negates the longitudinal effect of pressure $P_3$ on the flow control valve. $P_3$ is the pressure in chamber 32 at outlet opening 18 downstream of ports 34. Therefore, $P_3$ neither adds nor subtracts from the spring bias. Further, when the valve sleeve slides over the outer ends of ports 34, it unexpectedly provides for superior control. The condition exists because the small outer ends of ports 34 are at the inlet from the higher pressure of $P_2$, and the larger, inner ends of the ports are at the lower pressure $P_3$. The port configuration is such that the area to be closed or covered by valve sleeve 42 is lesser in area and therefore requires less sleeve movement, that is, a shorter stroke and therefore less spring compression.

Figure 2:
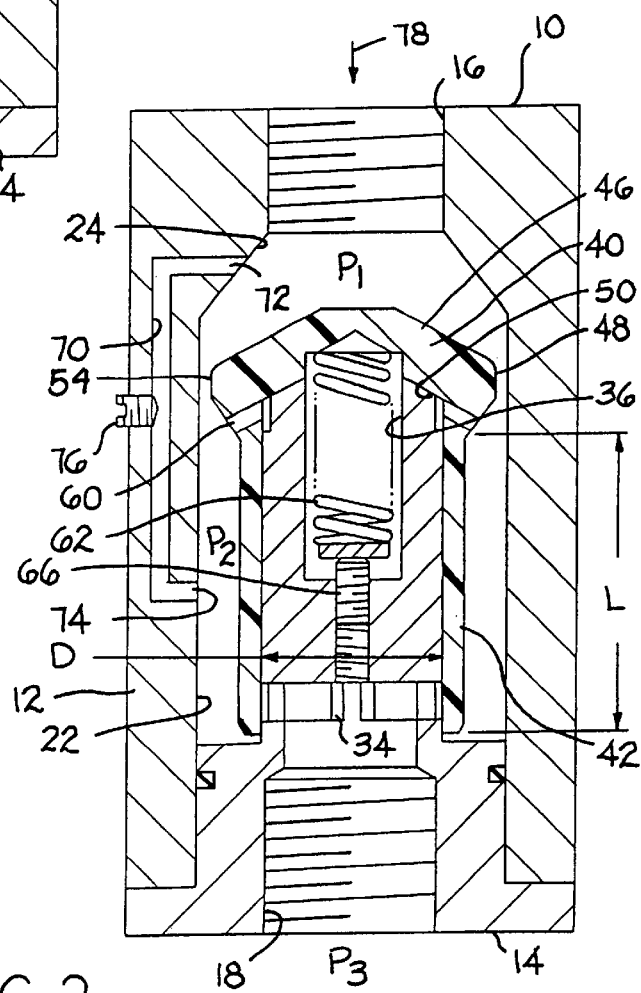
FIG. 2 is a view similar to FIG. 1 but with the piston sleeve fully closing the outlet opening.

Referring to FIG. 2, the valve sleeve has a length L in sliding contact with support tube 28. The outer diameter D of the support tube preferably has a ratio to L of 1:1.5 to prevent the sleeve from becoming cocked on the tube.

Figure 3:
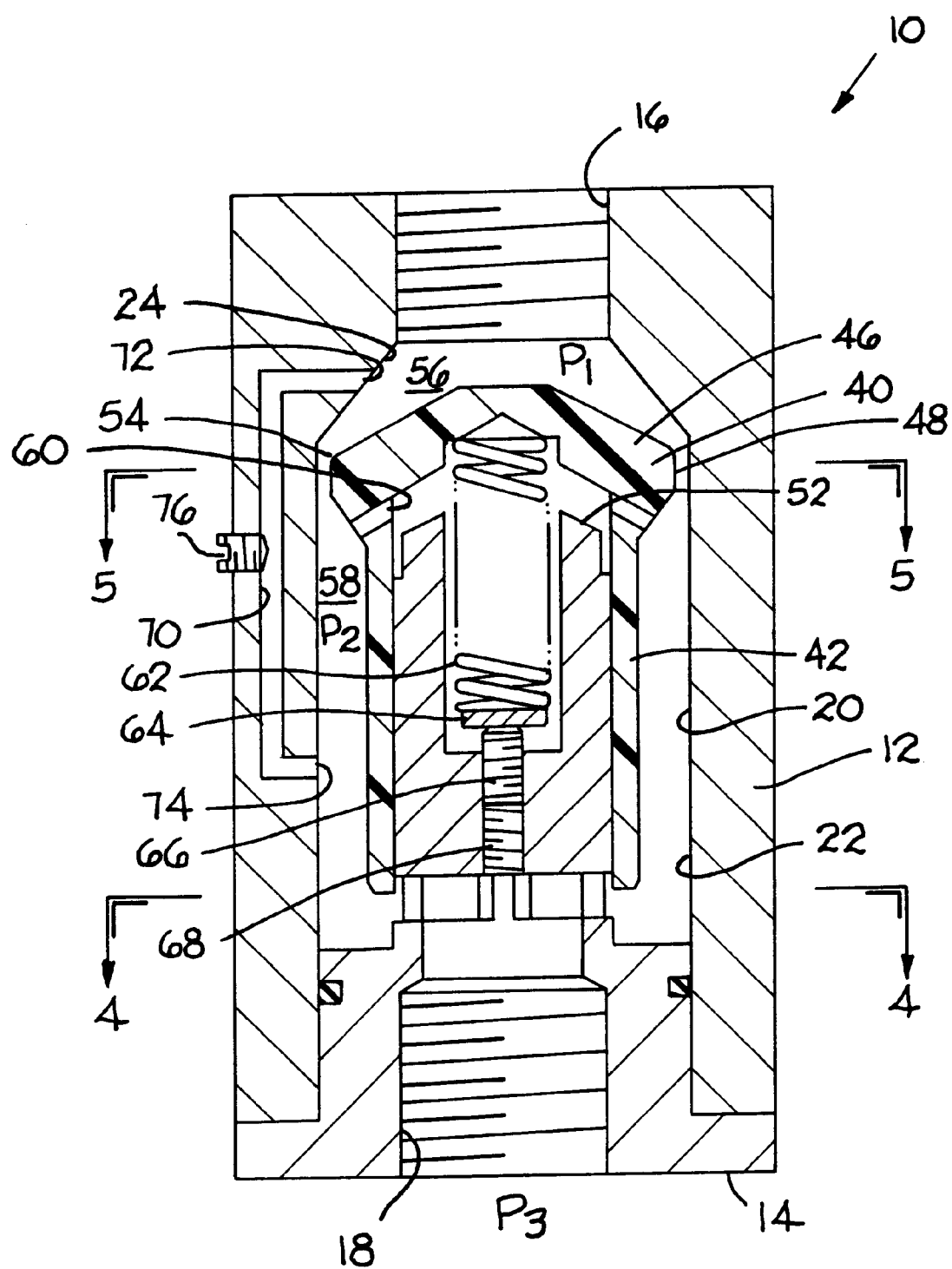
FIG. 3 shows the piston partially blocking the outlet opening.

Referring to FIG. 3, when the piston permits fluid flow into chamber 20, the piston head and the chamber side wall form an annular orifice 54 between the upstream end 56 of the chamber and the downstream end 58 on the lower side of the piston head. The fluid pressure upstream of orifice 54 is at $P_1$, the downstream pressure is $P_2$. Orifice 54 initially increases in area to form a variable orifice opening until the outside spherical edge of the piston head is adjacent to the cylindrical side wall. Orifice 54 then remains fixed in area as the piston moves away from the inlet opening.

The piston has port means 60 downstream of orifice 54 which delivers fluid to the inside lower surface of the piston head thereby creating areas affected by $P_2$ equal to the areas affected by $P_1$, producing a fluid bias toward the inlet opening. The fluid acting on the upstream or upper end of the piston head biases the piston away from the inlet opening.

A helical spring 62 is disposed in cavity 36 to bias the piston head toward the inlet opening. The rectangular ports 34 reduce the required travel of sleeve 42, which reduces the compression of the spring to reduce the error of increased spring force. A washer 64 is mounted in the bottom of cavity 36. A set screw 66 is disposed in a tapped opening 68 and engages the washer. The user adjusts the washer position with respect to the bottom of the cavity to adjust the tension of the spring acting on the piston.

The housing has a bypass conduit 70 parallel to chamber 20 with an inlet end 72 which opens into the frusto-conical surface 24 upstream of orifice 54, and an opposite end 74 which opens into the chamber downstream of orifice 54.

An adjusting needle valve 76 is disposed in the housing to adjust the opening of bypass conduit 70 for adjusting the effective area of the opening at orifice 54. The needle valve can be moved to a position in which it fully closes fluid flow through bypass conduit 70.

Several variables can be adjusted to achieve the desired flow rate, for example, the diameter of the cylinder wall, the spring characteristics, the diameter of the piston enlargement, the position of needle valve 76, or the position of set screw 66 which adjusts the tension of the spring.

In use, the inlet fluid is delivered in the direction of arrow 78 and passes down through the fixed orifice area 54 between the piston head and the inner cylindrical surface of the valve chamber. Part of the fluid that passes through orifice 54 is delivered to the undersurface of the piston head through port means 60 to produce a force on the area affected by $P_2$ equal to the area affected by $P_1$. The fluid then passes downwardly through ports 34 to outlet opening 18. If the incoming fluid pressure increases, the pressure differential across orifice 54 causes the piston to move downwardly to partially block the flow through ports 34 sufficiently to ensure the flow rate remains constant. If the incoming fluid pressure is reduced, the pressure differential across orifice 54 will cause the piston to rise toward the inlet opening thereby increasing the area of the discharge ports, to cause the flow rate to remain constant.

Figure 6:
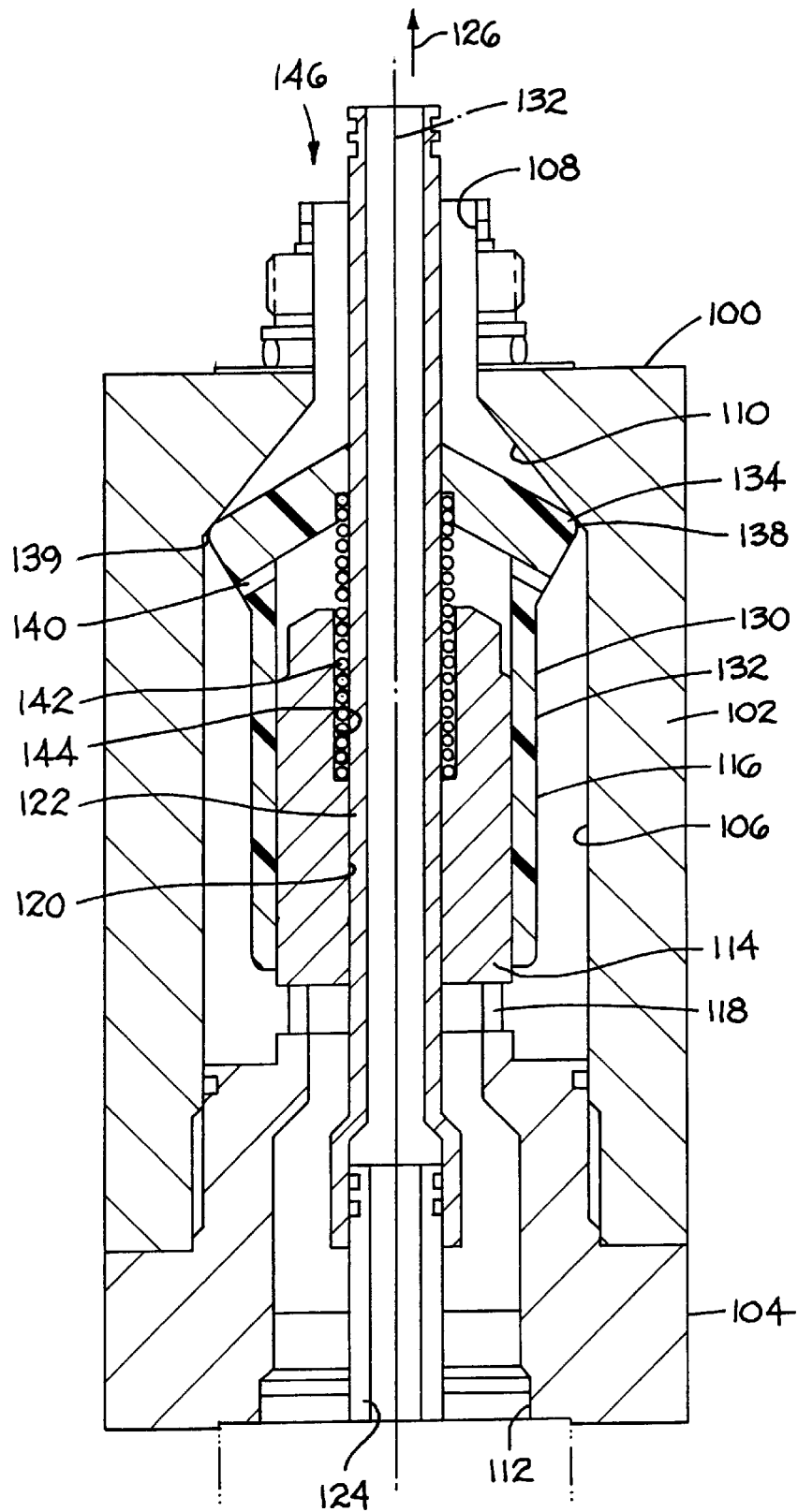
FIG. 6 is a view of another embodiment of the invention which permits two fluids to simultaneously flow in opposite directions.

FIG. 6 shows another preferred flow control valve 100 having a housing 102 with a cap 104 closing off the lower end of the housing and forming an internal cylindrical chamber 106. The housing has an inlet opening 108 for receiving fluid past a frusto-conical surface 110 into chamber 106. The cap has an outlet opening 112, axially aligned with the inlet opening, for discharging fluid from chamber 106. The cap supports upright valve tube 114 which extends into the chamber and has a cylindrical outer surface 116. The valve tube has a plurality of discharge ports 118 which communicate chamber 106 with outlet opening 112. The valve tube also has an axial opening 120 supporting a reverse flow tube 122 which extends through inlet opening 108 toward the outlet opening. A tubular extension 124 is connected to tube 120 and extends through outlet opening 112 to permit a reverse flow of a second fluid in direction of arrow 126.

A piston 130 formed of a plastic or other suitable material has a valve sleeve 132 having a diameter substantially less than the inside cylindrical diameter of the chamber. The piston has a head 134 with an annular edge forming a portion of a sphere. The piston slides axially on the valve tube along axis 132. The head of the piston has a diameter at 138 which is smaller than the diameter of the cylindrical wall to form an orifice 139 between the piston head and the chamber having a fixed area. Orifice 139 is initially variable in area as the piston head disengages from the frusto-conical surface, and then becomes fixed in area as it slides along the cylindrical surface of chamber 106. The valve sleeve slides over ports 118 to define a variable orifice.

The piston has ports 140 under the piston head to deliver fluid to the inside of the piston creating a force on an area affected by P2 equal to areas affected by $P_1$ which biases the piston head toward the inlet opening.

A helical spring 142 is mounted in a spring chamber 144 in the valve tube. The spring biases the piston toward the inlet opening and is chosen according to the desired flow rate. The piston is moveable between an upper closed position illustrated in FIG. 6 in which it abuts frusto-conical surface 110 to block the incoming fluid flowing in the direction of arrow 146. When the incoming fluid pressure increases to a predetermined level, it biases the piston away from the inlet opening thereby forming the fixed orifice between the piston and the chamber wall. The piston then assumes an axial position that depends upon the pressure differential between the upstream and downstream sides of the fixed orifice which in turn defines the position of the valve sleeve with respect to the discharge ports which form the variable orifice.

The piston thus comprises a unitary structure which forms a part of the fixed orifice as well as the variable orifice and thereby cooperates to provide a constant flow rate despite variable fluid pressures.

Having described my invention, I claim:

1. A constant flow rate regulating device, comprising:
   - a housing having an internal cylindrical side surface (22), an inlet opening (16), and an outlet opening (18);
   - a hollow support tube (28) located within said housing in axial alignment with said outlet opening;
   - a flow control piston (40) slidably supported on said support tube, said piston comprising a valve sleeve (42) slidable on said tube and an enlarged head (46), said enlarged head having a circular edge in close proximity to said internal side surface of said housing to form an annular throttling orifice that exerts a pressure drop on the fluid flowing from said inlet opening into the annular space surrounding said valve sleeve;
     spring means (62) within said support tube biasing said piston in the direction of said inlet opening;
     plural flow control ports (34) in said support tube communicating the annular space surrounding said valve sleeve with said outlet opening;
     said valve sleeve having a downstream edge movable across said flow control ports to progressively reduce the port flow area as the flow control piston moves away from said inlet opening; and
   - a reverse flow conduit disposed in the support tube from the inlet opening to the outlet opening for passing a second fluid in the reverse direction as a first fluid passes from the inlet opening toward the outlet opening.

2. A flow control valve as defined in claim 1, in which the inlet opening and the outlet opening are axially aligned.

3. A constant flow control valve, comprising:
   - a housing having a longitudinal axis, an internal cylindrical side surface concentric around said axis, an inlet opening on said axis, a circular annular divergent surface extending from said inlet opening to said cylindrical side surface, and an outlet opening on said axis;
   - a central post on said axis within the space circumscribed by said cylindrical side surface to form an annular chamber; said post having plural radial flow control ports communicating said annular chamber with said outlet opening;
   - a hollow piston slidably positioned on said post for movement along said longitudinal axis; said piston having a relatively large diameter head having a circular edge aligned with said annular divergent surface, and a relatively small diameter sleeve having a downstream edge adapted to move across said flow control ports;
   - spring means biasing said piston toward said annular divergent surface;
     said piston being dimensioned so that the sleeve progressively reduces the flow area through said flow control ports as the circular edge on the piston head increases the flow area along said annular divergent surface, said circular edge being in close proximity to said internal side surface of the housing to form an annular throttling orifice that exerts a pressure drop on the fluid flowing from said inlet opening into said annular chamber;
     said post having a cylindrical outer surface slidably supporting said piston sleeve and an inner surface communicating with said outlet opening;
     each of said flow control ports being smoothly tapered from the inner surface of the post to the outer surface of the post, whereby the port area at the post outer surface controls fluid flow from the annular chamber to the outlet opening; and
   - a reverse flow conduit disposed in the central post support tube between the inlet opening and the outlet opening for passing a second fluid in the reverse direction as a first fluid passes from the inlet opening toward the outlet opening.

* * * * *